UNITED STATES PATENT OFFICE.

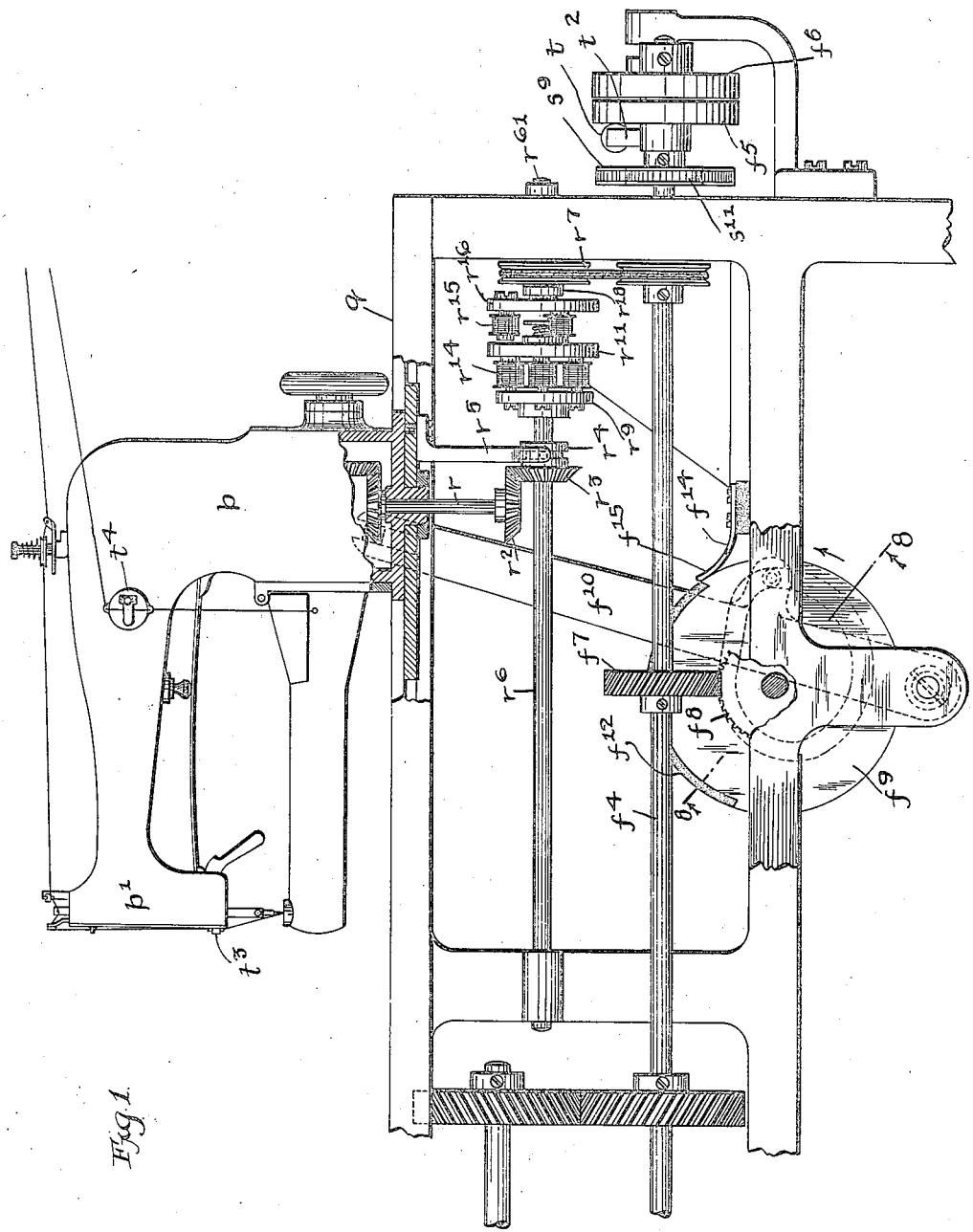

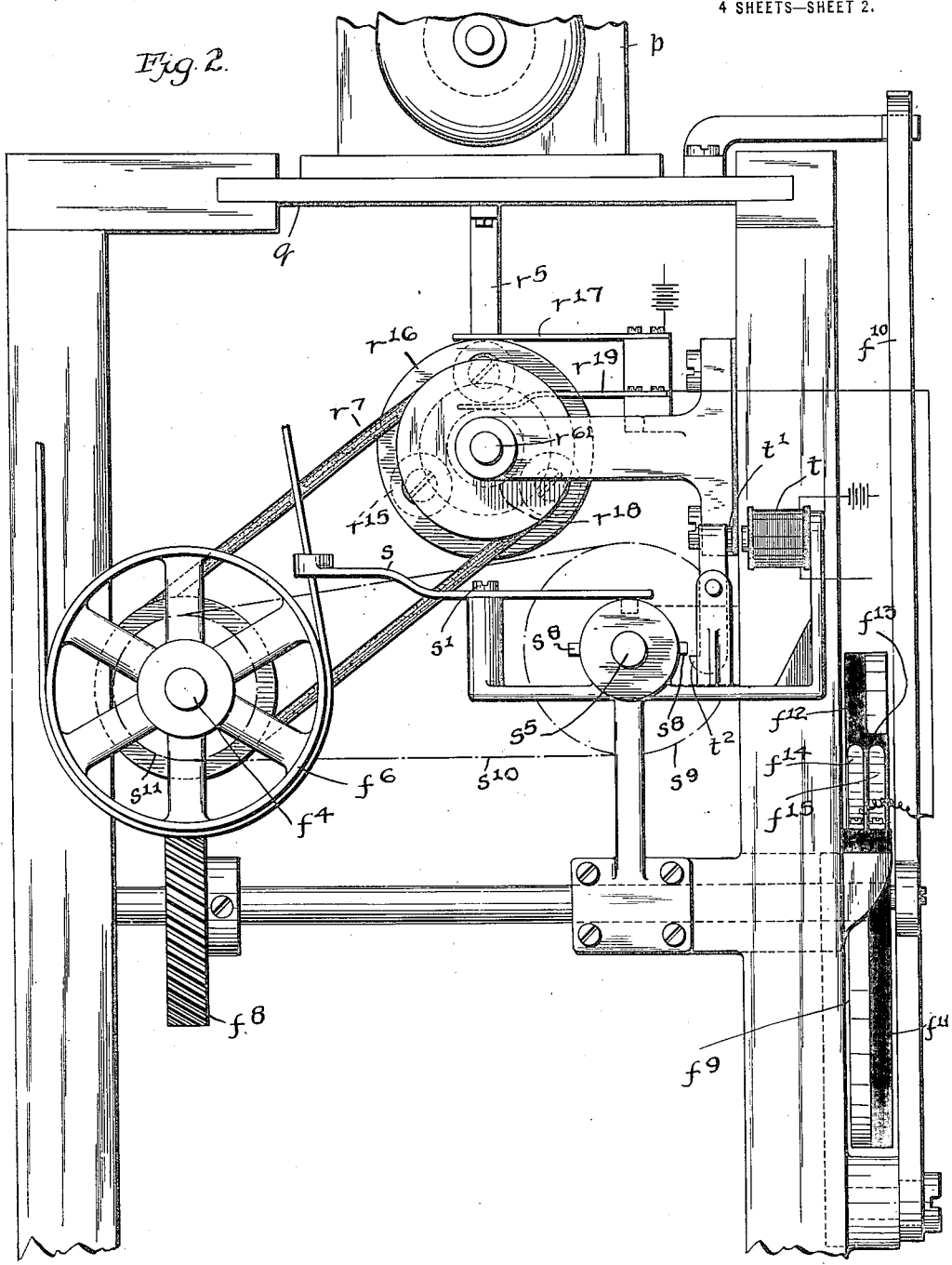

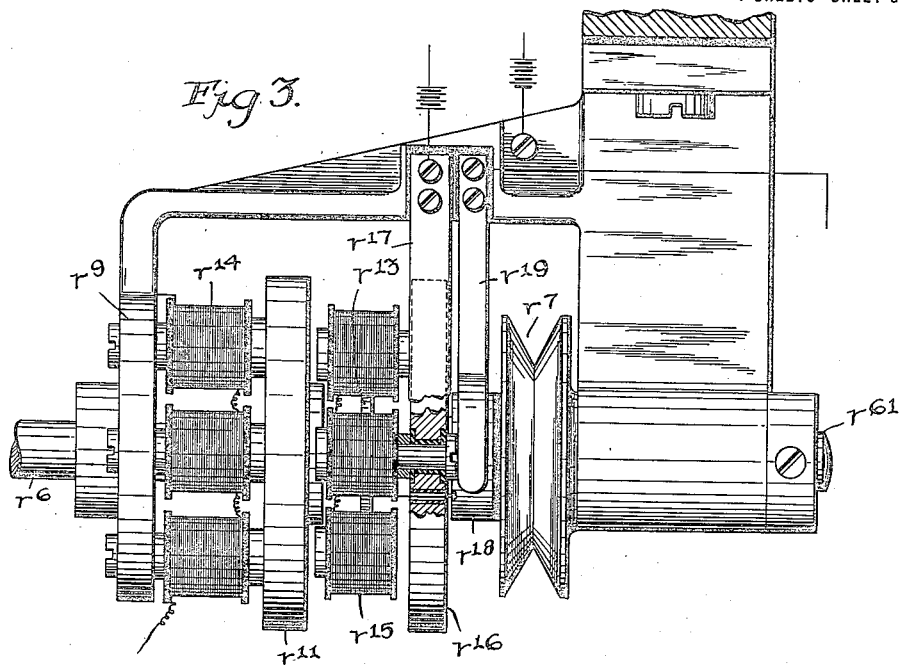
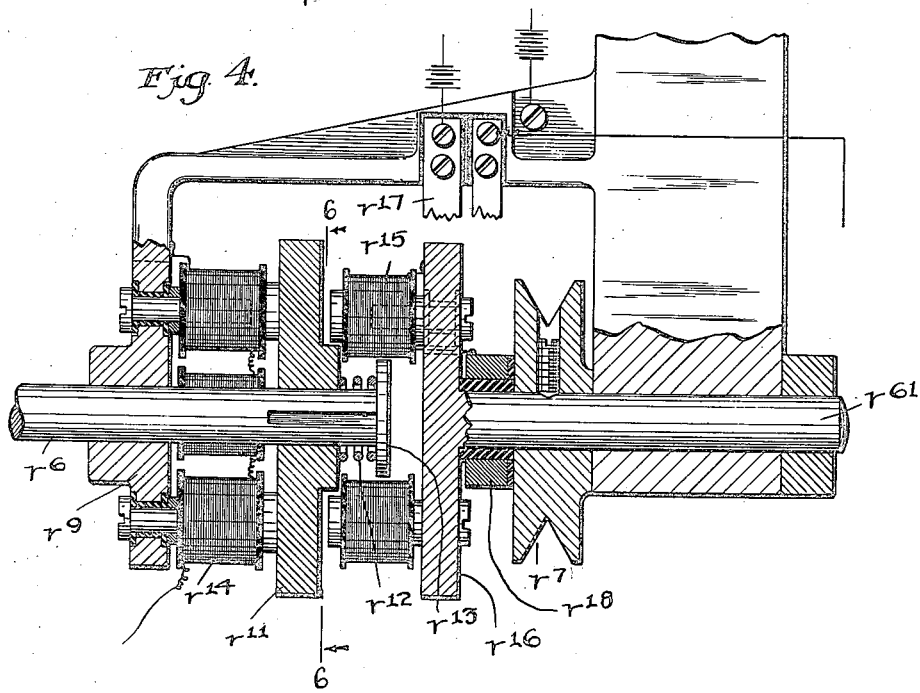

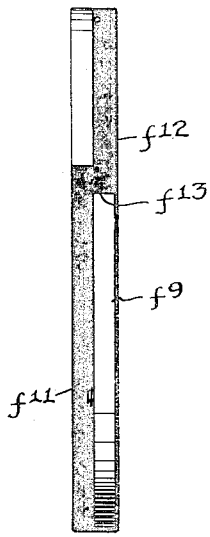
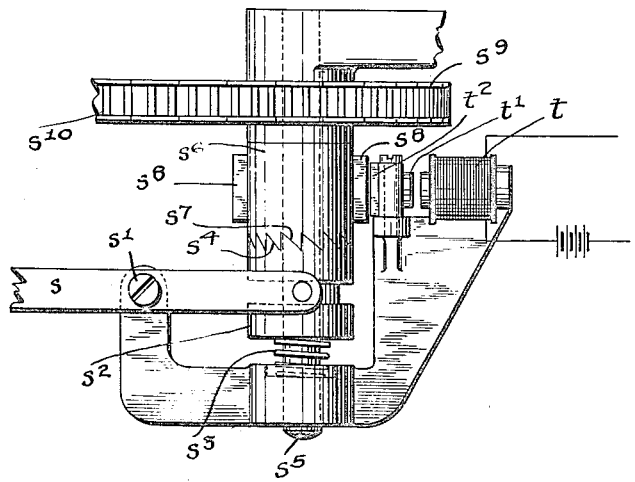
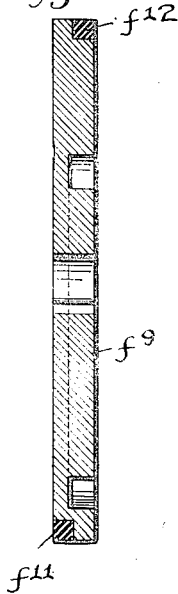
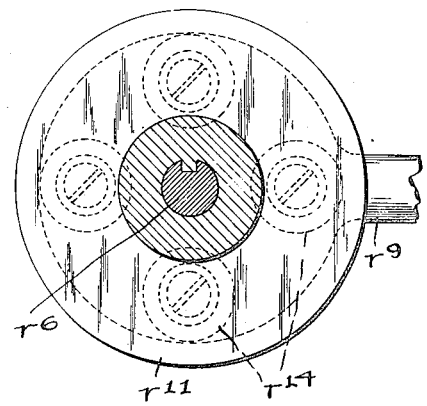
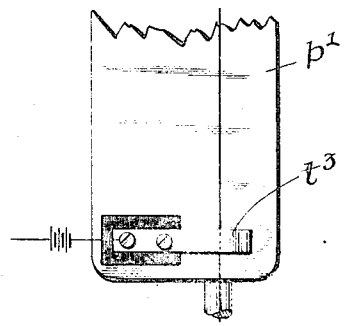

GEORGE E. MOLYNEUX, OF BAYONNE, NEW JERSEY.

CONTROLLING DEVICE FOR STITCHING MECHANISM, &c.

1,392,696.    Specification of Letters Patent.    Patented Oct. 4, 1921.

Application filed December 1, 1917. Serial No. 204,971.

*To all whom it may concern:*

Be it known that I, GEORGE E. MOLYNEUX, a citizen of the United States, residing at Bayonne, in the State of New Jersey, have invented certain new and useful Improvements in Controlling Devices for Stitching Mechanism, &c., of which the following is a specification, reference being had to the accompanying drawings, forming a part hereof.

In another application for Letters Patent of the United States, Ser. No. 188,589, filed August 28, 1917, there is shown and described an apparatus for handling cloth blanks and the like in which two articles to be stitched together, such as two parts of a shoe lining, are assembled in proper relation on a stationary work table on which they are clamped, and a sewing mechanism then moves over the work table, stitching the two parts of the lining together. It is necessary that the stitching mechanism be started as it begins its operative movement over the work table and be stopped as soon as its operation is terminated. It is also necessary that provisions be made whereby the stitching mechanism shall be stopped upon breaking or giving out of the sewing thread. It is the object of this invention to provide means whereby these results may be accomplished satisfactorily. The invention will be explained more fully hereinafter with reference to the accompanying drawings in which it is illustrated as applied to such an apparatus as that referred to, although it will be clear that the invention is applicable to other forms of apparatus.

In the drawings—

Figure 1 is a view in elevation, partly broken out and in section, showing the stitching mechanism and the table and frame on which the stitching mechanism moves together with the driving mechanism.

Fig. 2 is a detail view on a larger scale in end elevation as seen from the right hand in Fig. 1, showing particularly the controlling devices.

Fig. 3 is a detail view in front elevation of the electromagnetic clutch shown in Fig. 1, with some of its associated parts.

Fig. 4 is a view of the devices shown in Fig. 3, chiefly in vertical section.

Fig. 5 is a detail top view of a portion of the controlling device for the main driving shaft.

Fig. 6 is a detail view in section on the plane indicated by the line 6—6 of Fig. 4, looking in the direction of the arrows.

Fig. 7 is an edge view of the controlling contact disk and actuating cam shown in Fig. 1.

Fig. 8 is a view of the same in diametrical section on the plane indicated by the line 8—8 of Fig. 1, looking in the direction of the arrows.

Fig. 9 is a detail view of the thread controlled contact maker carried on the sewing machine head.

In the embodiment of the invention illustrated in the drawings the stitching mechanism $p$, of any usual or suitable construction, is shown as adapted to be reciprocated on the frame or table $q$ so that it may be made to traverse the work to be stitched. It is also arranged to swivel about a vertical axis and is driven through a vertical shaft $r$, the axis of which coincides with the axis about which the stitching mechanism swivels, and a bevel gear $r^2$, from a bevel gear $r^3$, which has a circumferentially slotted hub $r^4$, engaged by a fork $r^5$ which is reciprocated with the stitching mechanism, the bevel gear $r^3$ being arranged to slide on but to rotate with its driving shaft $r^6$. The shaft $r^6$ is driven, through the medium of an electromagnetic clutch to be described, by a belt and pulleys, indicated at $r^7$, from a main driving shaft $f^4$ which is driven from the source of power under the control of a controlling device to be described.

The shaft $f^4$ drives, through skew gears $f^7$, $f^8$, a face cam $f^9$, which, through a lever $f^{10}$, effects the reciprocations of the stitching mechanism on its supporting frame $q$.

All of the parts thus far described are constructed and arranged to operate substantially as the corresponding parts, identified by corresponding reference characters, shown in the application above referred to.

For the purpose of effecting the starting and stopping of the stitching mechanism as it begins and ends its operative movement over the work table, a controlling clutch is interposed between the shaft $f^4$ and the shaft $r^6$ and the cam disk $f^9$, which effects the reciprocations of the stitching mechanism, is made to determine the action of the controlling device so that its operations shall be timed in harmony with the movements of the stitching mechanism. This controlling device may conveniently take the form of an electromagnetic clutch interposed between two alined sections of the driven shaft, such as the main section $r^6$ and the shorter section $r^{61}$, as shown in Figs. 1, 2, 3 and 4. The clutch illustrated embodies an armature disk $r^{11}$ keyed on the shaft $r^6$ so as to rotate therewith and to be free to slide longitudinally thereon to a limited extent, being pressed normally to the left by a spring $r^{12}$ interposed between the armature disk $r^{11}$ and a cap $r^{13}$ on the end of the shaft. The spring $r^{12}$ normally holds the clutch disk against a series of electromagnets $r^{14}$ which are mounted on the bracket $r^9$ which carries a bearing for the shaft $r^6$. Other electromagnets $r^{15}$, carried by a disk $r^{16}$, on the shaft section $r^{61}$, when energized, draw the disk $r^{11}$ away from the brake magnets $r^{14}$ and compel the rotation of the disk $r^{11}$ and shaft $r^6$ and therefore the operation of the stitching mechanism. When the circuit of the magnets $r^{15}$ is broken and the magnets $r^{14}$ are energized through a closing of the circuit through them the disk $r^{11}$ is held against them and a powerful braking effect is produced. The brake magnets $r^{14}$ are preferably connected in series, one terminal of the series being connected to the frame through the bracket $r^9$ and the other terminal being connected through the controlling switch, hereinafter mentioned, to the source of power which is also connected electrically to the frame.

The driving magnets $r^{15}$ are also connected in series, one end of the series being electrically connected through the disk $r^{16}$ and a spring contact finger $r^{17}$ which rests thereon to one side of the source of power, while the other end of the series is connected through an insulated contact ring $r^{18}$ and a spring contact finger $r^{19}$ to the other side of the source of power through the contact switch hereinafter mentioned.

The cam disk $f^9$ is made to serve as the controlling member of the switch which determines the electrical condition of the controlling device above referred to, that is, the energization of the brake magnets $r^{14}$ or the driving magnets $r^{15}$. As will appear by reference to Figs. 1, 2, 7 and 8, the disk $f^9$ has inset in its periphery strips of insulating material, as at $f^{11}$, $f^{12}$, $f^{13}$. With the movable contact member thus formed coöperate two contact fingers $f^{14}$ and $f^{15}$, which are insulated from the frame and from each other. The contact finger $f^{14}$ is connected electrically, as shown in Fig. 1, to one end of the windings of the brake magnet $r^{14}$. The other contact finger is electrically connected, as shown in Figs. 2, 3 and 4, to the contact finger $r^{19}$ and thence through the contact ring $r^{18}$ to one end of the winding of the driving magnets $r^{15}$ and thence, through the disk $r^{16}$ and the contact finger $r^{17}$, to the other side of the circuit. It will be understood that the body of the disk $f^9$ is in electrical connection with the frame of the machine which forms a part of both of the circuits referred to. It will now be seen that with the parts in the positions shown in Fig. 1, in which the stitching mechanism is just beginning its movement to the left, the driving magnets are energized and the stitching mechanism is operated; that as soon as the stitching mechanism has reached the limit of its movement toward the left and has completed the stitching operation, the circuit of the driving magnets is broken, and the circuit of the brake magnets is closed, so that the operation of the stitching mechanism ceases; while for an intermediate period of time, corresponding to that during which both contacts $f^{14}$ and $f^{15}$ rest upon the wide insulating strip $f^{13}$, both sets of magnets are deënergized.

The condition of the sewing thread is made to control the operation of the main driving shaft $f^4$ and therefore the operation of the entire apparatus as well as of the stitching mechanism. For this purpose the shaft $f^4$ is provided at its end with a fast pulley $f^5$ and a loose pulley $f^6$, a belt shifter $s$, being provided for the purpose of controlling the position of the driving belt. The belt shifter lever $s$, pivoted at $s'$, engages a circumferentially slotted sleeve $s^2$ pressed normally by a spring $s^3$ in a direction to hold its cam teeth $s^4$ against the corresponding cam teeth $s^7$ of a sleeve $s^6$. The sleeve $s^2$ is keyed on a shaft $s^5$ so as to rotate therewith but to be free to slide longitudinally thereon. The sleeve $s^6$ is mounted loosely on the shaft $s^5$ and is armed with projecting lugs $s^8$. Fast on the shaft $s^5$ is a chain wheel $s^9$, operatively connected by a chain $s^{10}$ with a chain wheel $s^{11}$ fast on the driving shaft $f^4$. A pivoted detent $t^2$ carries the armature $t'$ of an electromagnet $t$, the electrical condition of which is controlled by the sewing thread. As shown in Figs. 1 and 9 the sewing thread passes between a contact finger $t^3$ and the head $p'$ of the stitching mechanism, close to the needle bar. The finger $t^3$ and the head are in electrical connection with a source of current and the magnet $t$, the finger $t^3$ being held normally out of contact with the head $p'$ by the sewing thread which passes between them. As soon as the thread fails, however, the circuit is completed between the finger $t^3$ and the head $p'$, the magnet $t$ is energized, the detent $t^2$ is thrown into the path of the lugs $s^8$, the sleeve $s^6$ is held from rotation, and the coöperating cam teeth $s^7$ and $s^4$ compel the sleeve $s^2$ to be moved against the pressure of the spring $s^3$ and thereby to actuate the shifting lever $s$ to throw the driving belt from the fast pulley to the loose pulley, stopping the apparatus. A similar contact device may be provided for the looper thread as shown at $t^4$ in Fig. 1 and similarly connected to the magnet $t$, as well understood, so as to effect the stopping of the mechanism in case of failure of the looper thread.

It will be understood that various changes in details of construction and arrangement may be made to suit different conditions of use and that the invention is not restricted to the particular construction and arrangement shown and described herein, except so far as may be indicated in the accompanying claims.

I claim as my invention:

1. In an apparatus of the character described, the combination of stitching mechanism, means to reciprocate the stitching mechanism continuously through a predetermined movement including a cam wheel, means to operate the stitching mechanism, electromagnetic controlling devices for the operating means and devices operated with said cam wheel for determining the operation of the controlling devices, whereby the reciprocation of the stitching mechanism is continuous through a predetermined movement and the operation of the stitching mechanism is discontinuous.

2. In an apparatus of the character described, the combination of stitching mechanism, means to reciprocate the stitching mechanism continuously through a predetermined movement including a cam wheel, means to operate the stitching mechanism, an electromagnetic controlling device for the operating means and contact devices operated by the rotation of the cam wheel for determining the operation of the electromagnetic controlling devices, whereby the reciprocation of the stitching mechanism is continuous through a predetermined movement and the operation of the stitching mechanism is discontinuous.

3. In an apparatus of the character described, the combination of stitching mechanism, means to move the stitching mechanism continuously through a predetermined movement, independent means to drive the stitching mechanism including an electromagnetic clutch, and devices operated by the moving mechanism to control the electrical condition of said clutch, whereby the movement of the stitching mechanism is continuous through its predetermined movement and the operation of the stitching mechanism is discontinuous.

4. In an apparatus of the character described, the combination of stitching mechanism, a driving shaft therefor comprising two alined parts, an armature disk mounted on one of said parts, an electromagnet carried by the other of said parts, means to move the stitching mechanism, intermeshing gears for driving the stitching mechanism from said shaft, one of said gears being mounted on said shaft to rotate therewith and to slide thereon, and means actuated by said last named means to control the electrical condition of said electromagnet.

5. In an apparatus of the character described, the combination of stitching mechanism, a driving shaft therefor comprising two alined parts, an armature disk carried by one of said parts, a driving magnet carried by the other of said parts at one side of said armature disk, a stationary brake magnet at the other side of said armature disk, means to move the stitching mechanism, intermeshing gears for driving the stitching mechanism from said shaft, one of said gears being mounted on said shaft to rotate therewith and to slide thereon, and means actuated by said last named means to control the electrical condition of said magnets.

6. In an apparatus of the character described, the combination of stitching mechanism, a driving shaft therefor comprising two alined parts, an armature disk mounted on one of said parts to rotate therewith and to move longitudinally thereon, a driving magnet carried by the other of said parts at one side of said disk, a stationary brake magnet at the other side of said disk, means to move the stitching mechanism, intermeshing gears for driving the stitching mechanism from said shaft, one of said gears being mounted on said shaft to rotate therewith and to slide thereon, and means actuated by said last named means to control the electrical condition of said magnets.

7. In an apparatus of the character described, a stitching mechanism, means to move the stitching mechanism, a driving shaft for the stitching mechanism, operating connections between the driving shaft and the stitching mechanism, a controlling device to control the operation of said driving shaft, an electromagnetic device for actuating said controlling device and a circuit controlling device therefor mounted on the stitching mechanism and including two contacts normally separated by the sewing thread and adapted to complete the circuit on failure of the sewing thread.

This specification signed this 26th day of November, A. D. 1917.

GEORGE E. MOLYNEUX.